United States Patent [19]

Lane et al.

[11] Patent Number: 4,637,888
[45] Date of Patent: Jan. 20, 1987

[54] REVERSIBLE PHASE CHANGE COMPOSITION FOR STORING ENERGY

[75] Inventors: George A. Lane; Harold E. Rossow, both of Midland, Mich.

[73] Assignee: The Dow Chemical Company, Midland, Mich.

[21] Appl. No.: 743,237

[22] Filed: Jun. 11, 1985

Related U.S. Application Data

[63] Continuation-in-part of Ser. No. 504,763, Jun. 15, 1983, abandoned.

[51] Int. Cl.$^4$ ................................................ C09K 5/06
[52] U.S. Cl. ........................................................ 252/70
[58] Field of Search ........................................... 252/70

[56] References Cited

U.S. PATENT DOCUMENTS

| | | | |
|---|---|---|---|
| 4,272,390 | 6/1981 | Lane et al. | 252/70 |
| 4,392,971 | 7/1983 | Kimura et al. | 252/70 |
| 4,412,931 | 11/1983 | Lane et al. | 252/70 |

FOREIGN PATENT DOCUMENTS

| | | | |
|---|---|---|---|
| 51-70193 | 6/1976 | Japan | 252/70 |
| 53-19183 | 2/1978 | Japan | 252/70 |
| 56-141380 | 11/1981 | Japan | 252/70 |
| 57-96079 | 6/1982 | Japan | 252/70 |
| 57-139168 | 8/1982 | Japan | 252/70 |
| 57-180684 | 11/1982 | Japan | 252/70 |
| 59-109577 | 6/1984 | Japan . | |
| 60-04580 | 1/1985 | Japan | 252/70 |
| 2001096 | 1/1979 | United Kingdom | 252/70 |
| 568669 | 8/1977 | U.S.S.R. | 252/70 |

OTHER PUBLICATIONS

Feilchenfeld et al., "The Melting Point Adjustment of $CaCl_2.6H_2O$ by Addition of KCl or $CaBr_2.6H_2O$," Sol. Energy, 1985, 34(2) 199–201 (CA 103: 73842).

*Primary Examiner*—Robert A. Wax

[57] ABSTRACT

A reversible liquid/solid phase change composition for the storage of energy comprising a mixture of hydrated calcium bromide/calcium chloride and a modifier selected from KBr, KCl, or mixtures thereof, for modifying the semicongruent melting of the mixture to reduce the formation of crystalline $CaBr_2$ and $CaCl_2$ hydrate phases other than the hexahydrate phase. The composition is useful over a temperature range of from about 5° to about 50° C. and can be employed for the storage of coolness or heat, or as a buffer or heat sink to modulate diurnal swings in ambient temperature.

37 Claims, No Drawings

REVERSIBLE PHASE CHANGE COMPOSITION FOR STORING ENERGY

RELATED APPLICATION

This application is a continuation-in-part application of our copending application Ser. No. 504,763, filed June 15, 1983, now abandoned.

BACKGROUND OF THE INVENTION

The invention relates to reversible liquid/solid phase change compositions (PCM). More particularly, the invention resides in phase change compositions for the storage of energy comprising a mixture of hydrated calcium bromide and hydrated calcium chloride having added thereto a modifier selected from the group consisting of KBr, KCl, and mixtures thereof.

The modifier which is employed with the hydrated $CaBr_2/CaCl_2$ mixture of the invention is particularly effective to modify the semicongruent melting behavior of the mixture to reduce the formation of crystalline $CaBr_2$ and $CaCl_2$ hydrate phases other than the hexahydrate phase.

Preferably, the PCM of the invention also includes a nucleating agent which is particularly effective to reduce supercooling of the PCM to less than 3° C. during retrieval of the stored energy by crystallization. The nucleating agents which have been found to be effective in the quaternary or quinary PCM's of the invention are selected from the group consisting of $SrCl_2$, $Ba(OH)_2$, $BaO$, $SrBr_2$, $Sr(OH)_2$, $SrI_2$, $BaI$, $BaCO_3$, $SrCO_3$, and mixtures thereof.

The invention also resides in the use of the PCM of the particular composition as herein described in an energy stored device and in the method of storing energy.

The phase change compositions of the invention are useful over a broad temperature range of from about 5° to about 50° C. and thus can be employed (1) for the storage of "coolness" over a temperature range of from about 5° to about 17° C.; (2) for the storage of "heat" over a temperature range of from about 25° to about 50° C., and (3) as a buffer or heat sink to modulate diurnal swings in the ambient temperature range of from about 17° C. to about 27° C.

DESCRIPTION OF THE PRIOR ART

Phase change materials in which the heat of fusion of various hydrated salt compositions is employed are well known in the literature. In ASHRAE Journal of September 1974, pages 38–45, M. Telkes in an article entitled "Solar Energy Storage", evaluated the thermal, physical and other pertinent properties of various PCM's on the basis of economics, applicability, corrosion, toxicity, and availability for large scale installations.

A more comprehensive discussion of PCM's for use as thermal energy storage materials is given in Solar Heat Storage, Latent Heat Materials, by G. A. Lane, CRC Press, Boca Raton, Fla., 1983, pages 2–48, 143–148.

Particular reference is also made to the following prior publications:

(1) Japanese Publication No. 81/08483, Mitsubishi Electric Corporation, published Jan. 28, 1981, which discloses a PCM comprising $CaCl_2.6H_2O$ and/or $CaBr_2.6H_2O$ which is mixed with a small amount of an agent for preventing supercooling such as $BaHPO_4$ and other barium salts.

(2) Japanese Pat. No. 56-141380, Mitsubishi Electric Corporation, discloses a $CaBr_2/CaCl_2$ PCM hydrated with 6.2 to 8.4 moles of $H_2O$, where the $CaCl_2$ is present in an amount of from 50 to 90 mole percent and the $CaBr_2$ is present in an amount of from 10 to 50 mole percent of the salt. This does not teach the addition of a crystal phase modifier of KCl and/or KBr, nor any of the select nucleators of the invention.

(3) Japanese Pat. No. J57-139168, published Aug. 27, 1982, teaches the addition of KBr to minimize supercooling of $CaCl_2.6H_2O$. The patent does not disclose mixtures of hydrated $CaCl_2/CaBr_2$ PCM's nor does it teach the addition of a crystal phase modifier such as KCl and/or KBr or any of the select nucleators of the present invention.

(4) Japanese Pat. No. J51-070193, published June 17, 1976, discloses a hydrated $CaBr_2$ or $CaCl_2$ PCM. It does not disclose a mixture of hydrated $CaBr_2/CaCl_2$. The patent does not employ the Crystal Phase Modifier of KCl and/or KBr nor the select nucleators employed in the invention of the subject application.

(5) Japanese Pat. No. J53-019183, published Feb. 22, 1978, discloses the addition of $SrCl_2$ or $SrBr_2$ as nucleators to $CaCl_2.6H_2O$. The patent does not disclose a phase change material comprising a mixture of a hydrated $CaBr_2/CaCl_2$ nor the addition of a Crystal Phase Modifier of KCl and/or KBr to the basic PCM.

(6) Japanese Pat. No. J57-180684, published Nov. 6, 1982, discloses a hydrated $CaBr_2$ PCM. The patent does not disclose a mixture of a hydrated $CaBr_2/CaCl_2$ composition nor does it disclose the addition of a Crystal Phase Modifier of KCl and/or KBr to the composition.

(7) Japanese Pat. No. 57-096079, published June 1982, discloses a mixture of a hydrated $CaBr_2/CaCl_2$ phase change composition. The patent does not provide for the addition of the Crystal Phase Modifier of KCl and/or KBr as is required in the present invention.

(8) U.S. Pat. No. 4,392,971 (Kimura et al) discloses a heat storage material of $CaCl_2.6H_2O$ which has been modified by controlling the water content to a molar ratio of greater than 6.0 and less than 6.14 based on the $CaCl_2$ present in the heat storage material to prevent the crystallization of $CaCl_2.4H_2O$. Kimura also includes KCl, among others, as a nucleation promoting agent which is described as different from ordinary nucleating agents as it does not initiate nucleation itself.

In accordance with their teachings, Kimura, et al. reduce the thermodynamic tendency of the $CaCl_2.6H_2O$ to form the tetrahydrate by abandoning the hexahydrate stoichiometry of their composition by the adding of water in excess of 6.0 moles per mole of $CaCl_2$. In using extra water, Kimura et al have employed phase equilibrium principles to reduce the formation of $CaCl_2.4H_2O$ without altering the phase diagram. Under these conditions, however, deterioration can occur over repeated cycles of freezing and thawing of the PCM due to a settling-out of the hydrate crystals with a consequent loss of heat storage capacity.

The present invention effectively reduces the formation of tetrahydrate crystals by altering the phase diagram, i.e. the phase equilibrium behavior of the ternary $CaCl_2/CaBr_2/H_2O$ system so that the thermodynamic tendency to form unwanted tetrahydrate crystals is substantially mitigated or totally eliminated. This is accomplished in accordance with the teachings of the present invention by converting the ternary system to a quaternary or quinary system of $CaCl_2/CaBr_2/KCl$ and/or KBr and $H_2O$. With the addition of a sufficient amount of the modifiers KCl and/or KBr to the basic ternary mixture, substantially less or none of the tetrahydrate crystals can form in the PCM in accordance with the laws of thermodynamics.

The nucleation promoting agents i.e. NaCl, KCl, etc, described by Kimura, et al. are said to have excellent anti-supercooling effects. Kimura, et al. thus do not regard to recognize that their nucleation promoting agents act to modify the phase equilibrium behavior, i.e. the semicongruent melting behavior of their hydrated $CaCl_2$ composition. The quaternary and quinary congruently melting systems of the present invention effectively prevent the formation of $CaCl_2.4H_2O$ over long periods of time and over many cycles of freezing and thawing. No claim is made herein to heat storage materials as disclosed by Kimura, et al. in which a mixture of $CaCl_2/CaBr_2/KCl$ is provided having a water content in a molar ratio of greater than 6.0 and less than 6.14 based on $CaCl_2$ and $CaBr_2$ present in the composition.

Publications (1) through (8) generally disclose PCM's of $CaCl_2.6H_2O$ or mixtures of $CaBr_2.6H_2O$ and $CaCl_2.6H_2O$ having various nucleators added to the basic PCM. The present invention provides a hydrated $CaCl_2$ and $CaBr_2$ mixture having, in addition, a crystal phase modifier selected from KCl, KBr, or mixtures thereof to modify the semicongruent melting behavior of the hydrated $CaBr_2/CaCl_2$ mixture to reduce the formation of crystalline hydrate phases other than the $CaBr_2/CaCl_2.6H_2O$ phase.

The present invention also provides for a PCM of $CaCl_2/CaBr_2/KCl$ in which the hydration of the mixture is from about 28 weight percent water up to about 6 mole of water per mole of calcium salt, and from greater than 6.14 moles of water per mole of calcium salt up to about 50 weight percent water.

The PCM's of the invention are useful for the storage of "coolness" over a temperature range of from about 5° to about 17° C.; for the storage of heat over a temperature range of from about 25° to about 50° C., and as "Buffers" or heat sinks for modulating diurnal fluctuations in the ambient temperature range of from about 17° to about 27° C. PCM's which act as buffers or heat sinks are particularly useful in passive solar heated buildings or structures such as greenhouses or hothouses. Excess solar energy received during the daytime is used to melt or partially melt the PCM. At night, this energy is recovered by freezing the PCM and is transported or allowed to radiate to the building's other tempered space to raise the temperature, i.e. to heat the building or space.

SUMMARY OF THE INVENTION

The present invention particularly resides in a reversible liquid/solid phase change composition having a melting temperature of from about 5° to about 50° C., said composition comprising a hydrated mixture of from about 20 to about 67 weight percent $CaBr_2$, from greater than zero to about 38 weight percent $CaCl_2$, from about 28 to about 50 weight percent water, and a modifier selected from the group consisting of KBr, and mixtures of KBr and KCl, said modifier being present in an amount greater than zero to less than about 10 weight percent and sufficient to modify the semicongruent melting behavior of the $CaBr_2/CaCl_2$ mixture to reduce, during freezing of the composition, the formation of crystalline $CaBr_2$ and $CaCl_2$ hydrate phases other than the hexahydrate phase.

The invention also resides in a reversible liquid/solid phase change composition having a melting temperature of from about 5° C. to about 50° C., said composition comprising a hydrated mixture of from about 20 to about 67 weight percent $CaBr_2$, from greater than zero to about 38 weight percent $CaCl_2$, from about 28 weight percent water up to about 6.0 moles of water per mole of calcium salt and from greater than 6.14 moles of water per moles of calcium salt up to about 50 weight percent water, and from greater than zero to less than about 10 weight percent KCl but sufficient to modify the semicongruent melting behavior of the $CaBr_2/CaCl_2$ mixture to reduce, during freezing of the composition, the formation of crystalline $CaBr_2$ and $CaCl_2$ hydrate phases other than the hexahydrate phase.

The invention further resides in a method of storing energy, comprising the steps of preparing a reversible liquid/solid phase change composition which melts at a temperature from about 5° to about 50° C., by admixing from about 20 to about 67 weight percent $CaBr_2$, from greater than zero to about 38 weight percent $CaCl_2$, from about 28 to about 50 weight percent water, and a modifier in an amount greater than zero but less than about 10 weight percent and in an amount sufficient to modify the semicongruent melting behavior of the $CaBr/CaCl_2$ mixture to reduce, during freezing of the composition, the formation of crystalline hydrate phases other than the hexahydrate phase, said modifier being selected from the group consisting of KBr, and mixtures of KBr and KCl, introducing the composition into an encapsulating means for use as an energy storage device, and hermetically sealing the encapsulating means to prevent the escape of water vapors from the encapsulating means.

The invention further resides in an energy storage device comprising an encapsulating means containing the reversible liquid/solid phase change composition of the invention, and sealing means for the encapsulating means for hermetically sealing the composition in the encapsulating means to prevent the evaporation of water from the composition.

The composition of the present invention preferably includes one or more nucleating agents in an amount sufficient to reduce supercooling of the composition to less than about 3° C. during crystallization. Preferably, the nucleating agent is present in an amount greater than zero to about 5.0 weight percent. More preferably, the nucleating agent is present in an amount of from about 0.50 to about 2.0 weight percent. Although amounts greater than 5.0 weight percent may be present in the composition without detriment to the function of the composition, nucleators in amounts greater than 5.0 weight percent generally do not show any further benefits in reducing supercooling.

DEFINITIONS

The term "enthalpy" used herein defines a thermodynamic function of a system, equivalent to the internal energy plus the product of the pressure and the volume. Enthalpy is measured by the heat content per unit mass, e.g., in BTU's per pound.

The term "congruent melting" herein used defines a mixture of ingredients, based on hydrated $CaBr_2/CaCl_2$ for which, at the melting point, solid and liquid phases are in stable equilibrium, i.e., the solid phase contains no hydrated $CaBr_2$ or $CaCl_2$ other than the hexahydrate or solid solutions thereof, and the liquid phase contains, for every mole of $CaBr_2$ and $CaCl_2$, 6 moles of water plus sufficient water to form the stable hydrate of any additive materials in solution.

"Semicongruent melting" occurs when a phase change material has two or more hydrate forms with differing solid compositions and melting points. the material can be transformed in other hydrate forms before either complete melting or freezing occurs, resulting in a broadened melting point range. In addition, there is the temporary loss in thermal storage capacity. Calcium chloride hexahydrate is an example of a semicongruently melting phase change material.

"Incongruent melting" phase change materials yield two distinct phases upon melting, i.e., a saturated solution and a precipitate of an insoluble anhydrous salt. If the precipitate settles out of the solution, the anhydrous salt will not hydrate completely upon cooling and some thermal storage capacity will be lost with each freeze/melting cycle. Incongruent melting, as observed with sodium sulfate decahydrate, for example, is a more serious problem because it can result in a continual loss of latent heat storage capacity.

The term "supercooling" refers to a discrepancy between the temperature at which freezing initiates and the melting temperature of a given liquid/solid phase change material when cooled and heated.

The term "eutectic" or "eutectic mixture" designates a mixture of two or more components mixed in such a ratio that the melting point of the mixture is lower than that of either salt, and the entire mixture at one and the same temperature passes from the solid form into the liquid form, and vice versa.

The term "modifier" includes, in addition to the KCl, KBr, and mixtures thereof such as have been specified herein, the precursors of such modifiers which are nondetrimental to the function of the PCM's of the invention. More particularly, the modifiers herein referred to are either anhydrous or hydrated compositions of potassium salt precursors which would form the potassium salt upon addition to the hydrated $CaBr_2/CaCl_2$ mixture.

Impurities may also be present in the PCM of the invention in minor amounts of less than about 3.0 weight percent and provided that such impurities do not detrimentally affect the function of the basic hydrated $CaBr_2/CaCl_2$ mixture. Impurities may include, for example, LiCl or other calcium salts such as $CaCO_3$ or $CaSO_4$.

DETAILED DESCRIPTION OF THE INVENTION

For air conditioning, a PCM should preferably melt at a temperature at least 5° C. below the temperature of a room or space so that efficient heat exchange can be obtained between room air and the coolness storage material. Accordingly, at a room temperature of about 22° C. the maximum useful PCM melting point is about 17° C. As the freezing point of the PCM approaches 0° C., the refrigeration equipment which is used to charge the coolness storage increases in size and rating. Accordingly, a minimum practical PCM freezing point is about 5° C.

One aspect of the present invention resides in the development of a PCM for storing "coolness." It has been discovered that a PCM based on a minimum-melting mixture of $CaBr_2.6H_2O$ and $CaCl_2.6H_2O$ melts at a temperature of about 16° C. This mixture is not fully congruent melting, however, since some tetrahydrate crystals can form during freezing, thereby decreasing the storage capacity of the PCM. This defect was overcome by adding a sufficient amount of KCl, KBr, or mixtures thereof to the composition to modify the semicongruent melting behavior of the mixture substantially congruently melting.

Examples of PCM's which are particularly well adapted for storage of "coolness" and melting in the temperature range of from 5° to 17° C. are the following, in their order of preference with Example 3A being the most preferred composition:

EXAMPLE 1A $CaBr_2$—from about 28 to about 43 wt. %;
$CaCl_2$—from about 14 to about 31 wt. %;
KBr or mixtures of KBr and KCl—in an amount of greater than zero and less than 10 wt. %;
$H_2O$—from about 34 to about 48 wt. %.

EXAMPLE 2A $CaBr_2$—from about 30 to about 41 wt. %;
$CaCl_2$—from about 18 to about 26 wt. %;
KBr or mixtures of KBr and KCl—from about 2 to about 5 wt. %;
$H_2O$—balance of up to 100 wt. %.

EXAMPLE 3A $CaBr_2$—from about 32 to about 37 wt. %;
$CaCl_2$—from about 20 to about 24 wt. %;
KBr or mixtures of KBr and KCl—from about 3 to about 4 wt. %;
$H_2O$—balance of up to 100 wt. %.

EXAMPLE 4A $CaBr_2$—from about 28 to about 43 wt. %;
CaCl—from about 14 to about 31 wt. %;
KCl—in an amount greater than zero and less than 10 wt. %;
$H_2O$—balance up to 100 wt. % but excluding an amount of greater than 6.0 and less than 6.14 moles of water per mole of $CaCl_2$ plus $CaBr_2$.

Examples of PCM's which are particularly well adapted as heat storage materials melting in the range of from about 25° up to about 50° C. are the following, in their order of preference with Example 3B being the most preferred composition:

EXAMPLE 1B $CaBr_2$—from about 47 to about 67 wt. %;
$CaCl_2$—greater than zero but less than about 10 wt. %;
KBr or mixtures of KBr and KCl—in an amount greater than zero and less than about 10 wt. %;
$H_2O$—from about 29 to about 43 wt. %.

EXAMPLE 2B $CaBr_2$—from about 50 to about 66 wt. %;
$CaCl_2$—greater than zero but less than about 10 wt. %;
KBr or mixtures of KBr and KCl—from about 2 to about 5 wt. %;
$H_2O$—from about 31 to about 40 wt. %.

EXAMPLE 3B

CaBr$_2$—from about 52 to about 65 wt. %;
CaCl$_2$—greater than zero but less than about 10 wt. %;
KBr or mixtures of KBr and KCl—from about 3 to about 4 wt. %;
H$_2$O—from about 33 to about 36 wt. %.

EXAMPLE 4B

CaBr$_2$—from about 47 to about 67 wt. %;
CaCl$_2$—greater than zero but less than about 10 wt. %;
KCl—in an amount greater than zero and less than about 10 wt. %;
H$_2$O—from about 28 wt. % water up to about 6.0 moles of water per mole of calcium salt and from greater than 6.14 moles of water per mole of calcium salt up to about 50 wt. % water.

Examples of PCM's which are particularly well adapted as temperature buffers or heat sinks in passive solar energy heated structures melting in the temperature range of from about 17° to about 27° C. are the following, in their order of preference with Example 3C being the most preferred composition:

EXAMPLE 1C

CaBr$_2$—from about 38 to about 55 wt. %;
CaCl$_2$—from about 10 to about 25 wt. %;
KBr or mixtures of KBr and KCl—in an amount greater than zero and less than about 10 wt. %;
H$_2$O—from about 29 to about 43 wt. %.

EXAMPLE 2C

CaBr$_2$—from about 42 to about 55 wt. %;
CaCl$_2$—from about 10 to about 17 wt. %;
KBr or mixtures of KBr and KCl—from about 2 to about 5 wt. %;
H$_2$O—from about 36 to about 40 wt. %.

EXAMPLE 3C

CaBr$_2$—from about 46 to about 52 wt. %;
CaCl$_2$—from about 10 to about 15 wt. %;
KBr or mixtures of KBr and KCl—from about 2 to about 5 wt. %;
H$_2$O—from about 37 to about 39 wt. %.

EXAMPLE 4C

CaBr$_2$—from about 38 to about 55 wt. %;
CaCl$_2$—from about 10 to about 25 wt. %;
KCl—in an amount greater than zero and less than about 10 wt. %;
H$_2$O—from about 28 wt. % water up to about 6.0 moles of water per mole of calcium salt and from greater than 6.14 moles of water per mole of calcium salt up to about 50 wt. % water.

Examples of PCM's which are particularly well adapted as temperature buffers or heat sinks in passive solar energy heated structures melting in the temperature range of from about 17° to about 27° C. are the following, in their order of preference with Example 3D being the most preferred composition:

EXAMPLE 1D

CaBr$_2$—from about 20 to about 28 wt. %;
CaCl$_2$—from about 21 to about 28 wt. %;
KBr or mixtures of KBr and KCl—in an amount greater than zero and less than about 10 wt. %;
H$_2$O—from about 33 to about 50 wt. %.

EXAMPLE 2D

CaBr$_2$—from about 20 to about 28 wt. %;
CaCl$_2$—from about 25 to about 36 wt. %;
KBr or mixtures of KBr and KCl—from about 2 to about 5 wt. %;
H$_2$O—from about 40 to about 48 wt. %.

EXAMPLE 3D

CaBr$_2$—from about 20 to about 28 wt. %;
CaCl$_2$—from about 28 to about 35 wt. %;
KBr or mixtures of KBr and KCl—from about 3 to about 4 wt. %;
H$_2$O—from about 43 to about 46 wt. %.

EXAMPLE 4D

CaBr$_2$—from about 20 to about 28 wt. %;
CaCl$_2$—from about 21 to about 38 wt. %;
KCl—in an amount greater than zero and less than about 10 wt. %;
H$_2$O—from about 28 wt. % water up to about 6.0 moles of water per mole of calcium salt and from greater than 6.14 moles of water per mole of calcium salt up to about 50 wt. %.

Although the amount of KBr and/or KCl present in each of the above compositions is stated to be greater than zero weight percent it should be sufficient to improve the freezing behavior of the PCM. It has been found that an amount of greater than 10 weight percent generally has no additional benefit in the freezing behavior of the PCM.

The avoidance of supercooling during the crystallization of hydrated PCM's, as by the addition of various nucleating agents, is generally known in the literature.

The present invention preferably also provides for the addition of the select nucleating agents herein before enumerated in order to reduce supercooling in the hydrated CaBr$_2$/CaCl$_2$/KCl and/or KBr mixtures.

The following examples illustrate the effectiveness of reversible liquid/solid phase change compositions of the invention for storage of energy based on mixtures of hydrated CaBr$_2$ and CaCl$_2$.

EXAMPLE 5

This example is not an example of the invention but is included to show how a minimum-melting mixture of CaBr$_2$.6H$_2$O and CaCl$_2$.6H$_2$O was identified. A container of melted CaBr$_2$.6H$_2$O was cooled until a substantial quantity of crystals had been formed and an equilibrium had been established. Melted CaCl$_2$.6H$_2$O was then added by increments, allowing equilibrium to be established after each addition. At the equilibrium condition, the equilibrium temperature of the liquid composition was determined. The liquid composition was determined by chemical and instrument analysis. The minimum-melting composition was found at a temperature of 15.8° C. and contained 54.0 weight percent CaBr$_2$.6H$_2$O and 46.0 weight percent CaCl$_2$.6H$_2$O.

EXAMPLE 6

This example is also not an example of the invention but shows that the minimum-melting composition of Example 5 is semicongruently melting, that is, at equilibrium the tetrahydrate species crystallize initially before hexahydrate crystals begin to form. A container of the following melted salt mixture comprising 32.0 weight percent CaBr$_2$; 21.0 weight percent CaCl$_2$, and 47.0 weight percent H$_2$O was prepared and cooled until a substantial quantity of crystals had formed and equilibrium had been established. A melted material of the composition comprising 38.0 weight percent CaBr$_2$; 25.3 weight percent CaCl$_2$, and 36.7 weight percent H$_2$O, was then added incrementally, allowing equilibrium to be attained after each addition, and determining equilibrium temperature and liquid composition. From the data thus generated, the hexahydrate and tetrahydrate liquidi were obtained, and their intersection point, the peritectic point, was found to be at 16.3° C. and the composition was analyzed at 34.0 weight percent CaBr$_2$; 23.2 weight percent CaCl$_2$, and 42.8 weight percent H$_2$O. This composition was analyzed to contain 6.27 moles of water per gram atom of calcium. At a ratio of 6.00 moles of water per gram atom of calcium, the tetrahydrate liquidus was found to be at a temperature of 19.3° C. Thus, the hexahydrate composition must cool about 3.0° C., forming tetrahydrate crystals, at equilibrium, before the hexahydrate crystals can begin to form. This segregation of the material causes reduced heat storage capacity for the PCM.

EXAMPLE 7

This experiment is an example of the invention and was conducted in the same manner as Example 5, except that the starting material was CaBr$_2$.6H$_2$O saturated with KBr, and the material added incrementally was CaCl$_2$.6H$_2$O saturated with KCl. The minimum melting composition was found at a temperature of 14.6° C. and the composition contained 53.9 weight percent CaBr$_2$.6H$_2$O; 42.9 weight percent CaCl$_2$.6H$_2$O; 1.9 percent KBr, and 1.3 percent KCl.

EXAMPLE 8

This experiment is an example of the invention and was conducted in the same manner as Example 6, except that the starting material was of the following composition: 32.9 weight percent CaBr$_2$; 19.7 weight percent CaCl$_2$; 41.4 weight percent H$_2$O; 3.0 weight percent KBr, and 3.0 weight percent KCl. A mixture of the following composition was added incrementally: 37.5 weight percent CaBr$_2$; 22.5 weight percent CaCl$_2$; 33.9 weight percent H$_2$O; 3.0 weight percent KBr, and 3.0 weight KCl. In this example, however, the hexahydrate and tetrahydrate liquidi were found to intersect at a eutectic (rather than peritectic) point at a temperature of 14.7° C. The ratio of water to calcium was about 5.9 moles of water per gram atom of calcium. Further, at a ratio of 6.00 moles of water per gram atom of calcium, the hexahydrate liquidus was found to be at a temperature of 14.7° C., indicating a congruent-melting system with no tetrahydrate formation at equilibrium.

EXAMPLE 9

This experiment is an example of the invention and was conducted in the same manner as Example 6, except that the starting material was of the following composition: 43.4 percent CaBr$_2$; 13.3 percent CaCl$_2$; 39.7 percent H$_2$O; 2.7 percent KBr, 0.9 percent KCl; and the material which was added incrementally having the following composition: 46.0 percent CaBr$_2$, 13.6 percent CaCl$_2$; 36.7 percent H$_2$O; 2.7 percent KBr, 0.9 percent KCl. The hexahydrate and tetrahydrate liquidi were found to intersect at a temperature of 19.7° C., and at about 6.09 moles of water per gram atom of calcium, indicating a system in which very little tetrahydrate can form.

EXAMPLE 10

This experiment is an example of the invention and was conducted in the same manner as Example 6, except that the starting material was of the following composition: 48.0 weight percent CaBr$_2$; 9.6 weight percent CaCl$_2$; 38.4 weight percent H$_2$O; 3.3 weight percent KBr, and 0.8 weight percent KCl; and the material added incrementally had the composition: 51.1 weight percent CaBr$_2$, 10.2 weight percent CaCl$_2$; 35.1 weight percent H$_2$O; 2.9 weight percent KBr, and 0.7 weight percent KCl. The hexahydrate and tetrahydrate liquidi were found to intersect at a temperature of 24° C., and at about 5.8 moles of water per gram atom of calcium, indicating a system in which no tetrahydrate will form at equilibrium.

EXAMPLE 11

This experiment is an example of the invention in which a sample containing 34.57 weight percent CaBr$_2$; 21.98 weight percent CaCl$_2$; 40.19 weight percent H$_2$O; 1.90 weight percent KBr, and 1.36 weight percent KCl was divided into several aliquots, and freezing-melting tests were conducted. One of the aliquots was tested without any additives, but various nucleating agents were added to the other aliquots at the level of 0.5 weight percent in order to determine the effectiveness of such nucleators in the mixture. In each case, ten freeze-thaw cycles were induced by immersing a glass container with 80 grams of the material alternately in ice water and room temperature. Temperature of the sample was obtained from a thermocouple placed in the center of the sample. For each freezing cycle, the amount of supercooling (cooling below the melting point before onset of crystallization) was noted and these values were averaged for the ten cycles. Table I summarizes the data obtained with the addition of selected nucleators.

TABLE I

Effect of Nucleators on Supercooling

| Nucleators | Melting Point, °C. | Supercooling, °C. |
|---|---|---|
| None | 13–15 | 3.4 |
| SrCl$_2$ | 13–15 | 1.0 |
| Ba(OH)$_2$ | 12–15 | 1.1 |
| BaO | 12–15 | 1.2 |
| SrBr$_2$ | 13–16 | 1.4 |
| Sr(OH)$_2$ | 13–15 | 2.1 |
| SrI$_2$ | 12–15 | 2.6 |
| BaI$_2$ | 13–14.5 | 2.8 |
| BaCO$_3$ | 14–15 | 2.9 |

All of the nucleating additives listed in Table I were found to be effective in reducing supercooling of the PCM of the present invention.

What is claimed is:

1. A reversible liquid/solid phase change composition having a melting temperature of from about 5° to about 50° C., said composition comprising a hydrated mixture of from about 20 to about 67 weight percent CaBr$_2$, from greater than zero to about 38 weight percent CaCl$_2$, from about 28 to about 50 weight percent water, and a modifier selected from the group consisting of KBr, and mixtures of KBr and KCl, said modifier being present in an amount greater than zero to less than about 10 weight percent and sufficient to modify the semicongruent melting behavior of the CaBr$_2$/CaCl$_2$ mixture to reduce, during freezing of the composition, the formation of crystalline $CaBr_2$ and $CaCl_2$ hydrate phases other than the hexahydrate phase.

2. The composition of claim 1, wherein said mixture comprises from about 28 to about 43 weight percent $CaBr_2$, from about 14 to about 31 weight percent $CaCl_2$, and from about 34 to about 48 weight percent water.

3. The composition of claim 2, wherein said mixture comprises from about 30 to about 41 weight percent $CaBr_2$, from about 18 to about 26 weight percent $CaCl_2$, from about 2 to about 5 weight percent of the modifier, with the remainder being water in an amount of up to 100 weight percent of the composition.

4. The composition of claim 2, wherein said admixture comprises from about 32 to about 37 weight percent $CaBr_2$; from about 20 to about 24 weight percent $CaCl_2$, from about 3 to about 4 weight percent of the modifier, with the remainder being water in an amount of up to 100 weight percent of the composition.

5. The composition of claim 1, wherein said mixture comprises from about 38 to about 55 weight percent $CaBr_2$, from about 10 to about 25 weight percent $CaCl_2$, and from about 29 to about 43 weight percent water.

6. The composition of claim 5, wherein said mixture comprises from about 42 to about 55 weight percent $CaBr_2$, from about 10 to about 17 weight percent $CaCl_2$, and from about 36 to about 40 weight percent water, said modifier being present in an amount of from about 2 to about 5 weight percent.

7. The composition of claim 5, wherein said mixture comprises from about 46 to about 52 weight percent $CaBr_2$, from greater than 10 to about 15 weight percent $CaCl_2$, and from about 37 to about 39 weight percent water, said modifier being present in an amount of from about 3 to about 4 weight percent.

8. The composition of claim 1, wherein said mixture comprises from about 20 to about 28 weight percent $CaBr_2$, from about 21 to about 38 weight percent $CaCl_2$, and from about 33 to about 50 weight percent water.

9. The composition of claim 8, wherein said mixture comprises from about 20 to about 28 weight percent $CaBr_2$, from about 25 to about 36 weight percent $CaCl_2$, and from about 40 to about 48 weight percent water, said modifier being present in an amount of from about 2 to about 5 weight percent.

10. The composition of claim 8, wherein said mixture comprises from about 20 to about 28 weight percent $CaBr_2$, from about 28 to about 35 weight percent $CaCl_2$, and from about 43 to about 46 weight percent water, said modifier being present in an amount of from about 3 to about 4 weight percent.

11. The composition of claim 1, wherein said mixture comprises from about 47 to about 67 weight percent $CaBr_2$, from greater than zero to less than about 10 weight percent $CaCl_2$, and from about 29 to about 43 weight percent water.

12. The composition of claim 11, wherein said mixture comprises from about 50 to about 66 weight percent $CaBr_2$, from greater than zero to about 10 weight percent $CaCl_2$, and from about 31 to about 40 weight percent water, said modifier being present in an amount of from about 2 to about 5 weight percent.

13. The composition of claim 11, wherein said mixture comprises from about 52 to about 65 weight percent $CaBr_2$, from greater than zero to about 10 weight percent $CaCl_2$, and from about 33 to about 36 weight percent water, said modifier being present in an amount of from about 3 to about 4 weight percent.

14. The composition of claim 1, including one or more nucleating agents in the composition in an amount sufficient to reduce supercooling of the composition to less than 3° C. during retrieval of the stored energy by crystallization.

15. The composition of claim 14, wherein the nucleating agent is added in an amount of from greater than zero to about 5.0 weight percent.

16. The composition of claim 14, wherein the nucleating agent is selected from the group consisting of $SrCl_2$, $Ba(OH)_2$, $SrBr_2$, $Sr(OH)_2$, $SrI_2$, $BaI_2$, $BaO$, $BaCO_3$, $SrCO_3$ and mixtures thereof.

17. A reversible liquid/solid phase change composition having a melting temperature of from about 5° C. to about 50° C., said composition comprising a hydrated mixture of from about 20 to about 67 weight percent $CaBr_2$, from greater than zero to about 38 weight percent $CaCl_2$, from about 28 weight percent water up to about 6.0 moles of water per mole of calcium salt and from greater than 6.14 moles of water per mole of calcium salt up to about 50 weight percent water and from greater than zero to less than about 10 weight pecent KCl but sufficient to modify the semicongruent melting behavior of the $CaBr_2/CaCl_2$ mixture to reduce, during freezing of the composition, the formation of crystalline $CaBr_2$ and $CaCl_2$ hydrate phases other than the hexahydrate phase.

18. The composition of claim 17, wherein said mixture comprises from about 28 to about 43 weight percent $CaBr_2$, from about 14 to about 31 weight percent $CaCl_2$.

19. The composition of claim 18, wherein said mixture comprises from about 30 to about 41 weight percent $CaBr_2$, from about 18 to about 26 weight percent $CaCl_2$, and from about 2 to about 5 weight percent of the modifier.

20. The composition of claim 18 wherein said admixture comprises from about 32 to about 37 weight percent $CaBr_2$, from about 20 to about 24 weight percent $CaCl_2$, and from about 3 to about 4 weight percent of the modifier.

21. The composition of claim 17, wherein said mixture comprises from about 38 to about 55 weight percent $CaBr_2$, from about 10 to about 25 weight percent $CaCl_2$.

22. The composition of claim 21, wherein said mixture comprises from about 42 to about 55 weight percent $CaBr_2$, from about 10 to about 17 weight percent $CaCl_2$, and said modifier being present in an amount of from about 2 to about 5 weight percent.

23. The composition of claim 21, wherein said mixture comprises from about 46 to about 52 weight percent $CaBr_2$, from about 10 to about 15 weight percent $CaCl_2$, and said modifier being present in an amount of from about 3 to about 4 weight percent.

24. The composition of claim 17, wherein said mixture comprises from about 20 to about 28 weight percent $CaBr_2$, and from about 21 to about 38 weight percent $CaCl_2$.

25. The composition of claim 24, wherein said mixture comprises from about 20 to about 28 weight percent $CaBr_2$, from about 25 to about 36 weight percent $CaCl_2$, and said modifier being present in an amount of from about 2 to about 5 weight percent.

26. The composition of claim 24, wherein said mixture comprises from about 20 to about 28 weight percent $CaBr_2$, from about 28 to about 35 weight percent CaCl$_2$, and said modifier being present in an amount of from about 3 to about 4 weight percent.

27. The composition of claim 17, wherein said mixture comprises from about 47 to about 67 weight percent CaBr$_2$, and from greater than zero to about 10 weight percent CaCl$_2$.

28. The composition of claim 27, wherein said mixture comprises from about 50 to about 66 weight percent CaBr$_2$, from greater than zero to about 10 weight percent CaCl$_2$, and said modifier being present in an amount of from about 2 to about 5 weight percent.

29. The composition of claim 27, wherein said mixture comprises from about 52 to about 65 weight percent CaBr$_2$, from greater than zero to about 10 weight percent CaCl$_2$, and said modifier being present in an amount of from about 3 to about 4 weight percent.

30. The composition of claim 17, including one or more nucleating agents in an amount sufficient to reduce supercooling of the composition to less than 3° C. during retrieval of the stored energy by crystallization.

31. The composition of claim 30, wherein the nucleating agent is present in an amount of from greater than zero to about 5.0 weight percent.

32. The composition of claim 30, wherein the nucleating agent is selected from the group consisting of SrCl$_2$, Ba(OH)$_2$, SrBr$_2$, Sr(OH)$_2$, SrI$_2$, BaI$_2$, BaO, BaCO$_3$, SrCO$_3$, and mixtures thereof.

33. An energy storage device comprising an encapsulating means containing the reversible liquid/solid phase change composition of claim 1 or 17, wherein said phase change composition is hermetically sealed in said encapsulating means to prevent the evaporation of water from the phase change composition.

34. A method of storing energy, comprising the steps of preparing a reversible liquid/solid phase change composition which melts at a temperature of from about 5° to about 50° C., by admixing from about 20 to about 67 weight percent CaBr$_2$, from greater than zero to about 38 weight percent CaCl$_2$, from about 28 to about 50 weight percent water, and a modifier in an amount greater than zero but less than about 10 weight percent and in an amount sufficient to modify the semicongruent melting behavior of the CaBr/CaCl$_2$ mixture to reduce, during freezing of the composition, the formation of crystalline hydrate phases other than the hexahydrate phase, said modifier being selected from the group consisting of KBr, and mixtures of KBr and KCl, introducing the composition into an encapsulating means for use as an energy storage device, and hermetically sealing the encapsulating means to prevent the escape of water vapors from the encapsulating means.

35. The method of claim 34, including the step of adding a nucleating agent in an amount sufficient to reduce supercooling of the composition to less than 3° C. during retrieval of the stored energy by crystallization, said nucleating agent being selected from the group consisting of SrCl$_2$, Ba(OH)$_2$, BaO, SrCo$_3$, SrBr$_2$, Sr(OH)$_2$, SrI$_2$, BaI, BaCO$_3$, and mixtures thereof, said nucleating agent being added in an amount of from greater than zero to about 5.0 weight percent.

36. A method of storing energy, comprising the steps of preparing a reversible liquid/solid phase change composition which melts at a temperature of from about 5° to about 50° C., by admixing from about 20 to about 67 weight percent CaBr$_2$, from greater than zero to about 38 weight percent CaCl$_2$, and from about 28 weight percent water up to about 6.0 moles of water per mole of calcium salt and an amount greater than 6.14 moles of water per mole of calcium salt up to about 50 weight percent water, and KCl as a modifier in an amount greater than zero but less than about 10 weight percent but in an amount sufficient to modify the semicongruent melting behavior of the CaBr/CaCl$_2$ mixture to reduce, during freezing of the composition, the formation of crystalline hydrate phases other than the hexahydrate phase, introducing the composition into an encapsulating means for use as an energy storage device, and hermetically sealing the encapsulating means to prevent the escape of water vapors from the encapsulating means.

37. The method of claim 36, including the step of adding a nucleating agent in an amount sufficient to reduce supercooling of the composition to less than 3° C. during retrieval of the stored energy by crystallization, said nucleating agent being selected from the group consisting of SrCl$_2$, Ba(OH)$_2$, BaO, SrBr$_2$, Sr(OH)$_2$, SrCO$_3$, SrI$_2$, BaI, BaCO$_3$, and mixtures thereof, said nucleating agent being added in an amount of from greater than zero to about 5.0 weight percent.

* * * * *